United States Patent
Bradberry et al.

(10) Patent No.: US 10,836,450 B2
(45) Date of Patent: Nov. 17, 2020

(54) DEFLECTOR ASSEMBLY

(71) Applicants: Alfred Bradberry, Lawrenceville, GA (US); William Bradberry, Lawrenceville, GA (US)

(72) Inventors: Alfred Bradberry, Lawrenceville, GA (US); William Bradberry, Lawrenceville, GA (US)

( * ) Notice: Subject to any disclaimer, the term of this patent is extended or adjusted under 35 U.S.C. 154(b) by 204 days.

(21) Appl. No.: 16/019,967

(22) Filed: Jun. 27, 2018

(65) Prior Publication Data

US 2020/0001941 A1  Jan. 2, 2020

(51) Int. Cl.
*B62J 23/00* (2006.01)
*B60R 19/54* (2006.01)
*B62K 5/01* (2013.01)

(52) U.S. Cl.
CPC ............... *B62J 23/00* (2013.01); *B60R 19/54* (2013.01); *B62K 5/01* (2013.01)

(58) Field of Classification Search
CPC .................................. B62J 23/00; B60R 19/54
See application file for complete search history.

(56) References Cited

U.S. PATENT DOCUMENTS

| | | | |
|---|---|---|---|
| 4,673,190 A | 6/1987 | Ahlberg | |
| 5,174,622 A | 12/1992 | Gutta | |
| 5,531,478 A * | 7/1996 | Houston | B60R 19/54 280/756 |
| 5,884,890 A * | 3/1999 | Fraley, Jr. | H01Q 1/3258 248/539 |
| 7,266,431 B2 * | 9/2007 | Jackson | B60Q 1/2657 362/459 |
| 7,950,696 B2 | 5/2011 | Robertson | |
| 8,087,694 B2 | 1/2012 | Johnson | |
| 8,176,832 B1 * | 5/2012 | Rose | F41H 11/11 280/770 |
| 8,439,240 B1 * | 5/2013 | Steiner | G06Q 50/22 224/274 |
| D686,551 S * | 7/2013 | Lyle | D12/181 |
| 9,132,796 B1 * | 9/2015 | Matthews | B60R 19/54 |
| 9,403,570 B2 * | 8/2016 | Robbins | B62J 17/02 |
| D784,899 S | 4/2017 | McConnell | |
| 9,718,424 B1 * | 8/2017 | Rogers, Jr. | B60R 19/54 |
| 2007/0252071 A1 * | 11/2007 | Huang | B62J 11/00 248/539 |
| 2013/0277953 A1 * | 10/2013 | Matthews | B60R 19/54 280/762 |
| 2016/0052560 A1 * | 2/2016 | Peterson | B60R 21/13 280/154 |

* cited by examiner

Primary Examiner — Katy M Ebner

(57) ABSTRACT

A deflector assembly for protecting a driver of an open-topped vehicle includes a pair of rods, a connector, and a pair of couplers. The connector is coupled to a first end of each rod so that the connector extends between the rods. Each coupler is coupled to a second end of a respective rod. The coupler is configured to couple to an open-topped vehicle proximate to a respective front corner of the open-topped vehicle so that the rods extend upwardly from the open-topped vehicle. The rods are configured to sweep an object from a path in front of a driver of the open-topped vehicle to prevent contact between the object and the driver.

9 Claims, 5 Drawing Sheets

US 10,836,450 B2

DEFLECTOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to deflector assemblies and more particularly pertains to a new deflector assembly for protecting a driver of an open-topped vehicle.

BRIEF SUMMARY OF THE INVENTION

An embodiment of the disclosure meets the needs presented above by generally comprising a pair of rods, a connector, and a pair of couplers. The connector is coupled to a first end of each rod so that the connector extends between the rods. Each coupler is coupled to a second end of a respective rod. The coupler is configured to couple to an open-topped vehicle proximate to a respective front corner of the open-topped vehicle so that the rods extend upwardly from the open-topped vehicle. The rods are configured to sweep an object from a path in front of a driver of the open-topped vehicle to prevent contact between the object and the driver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
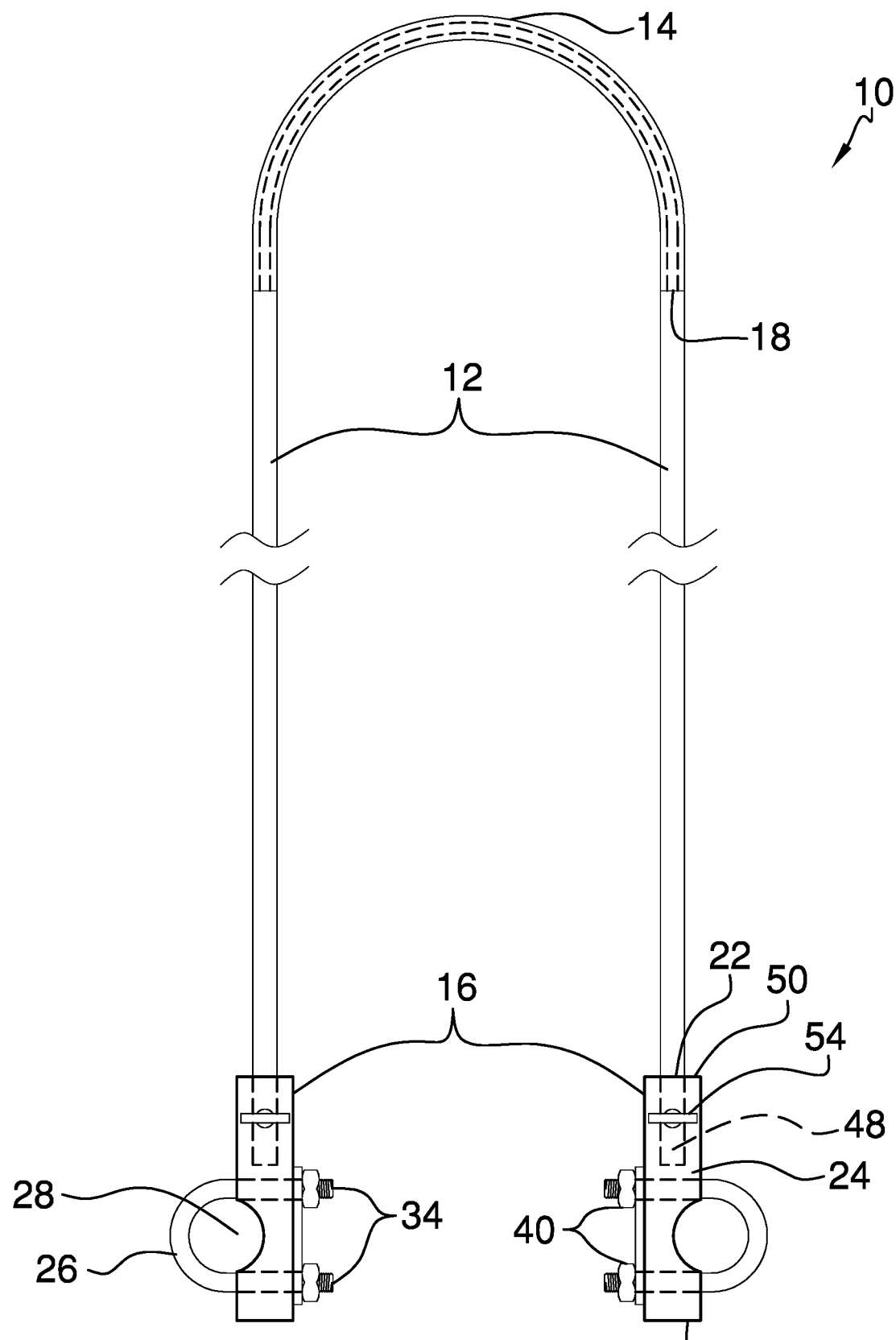
FIG. 1 is a front view of a deflector assembly according to an embodiment of the disclosure.

With reference now to the drawings, and in particular to FIGS. 1 through 5 thereof, a new deflector assembly embodying the principles and concepts of an embodiment of the disclosure and generally designated by the reference numeral 10 will be described.

As best illustrated in FIGS. 1 through 5, the deflector assembly 10 generally comprises a pair of rods 12, a connector 14, and a pair of couplers 16. The rods 12 are flexible. The rods 12 comprise fiberglass or the like. The rods 12 are circularly shaped when viewed longitudinally.

Figure 5:
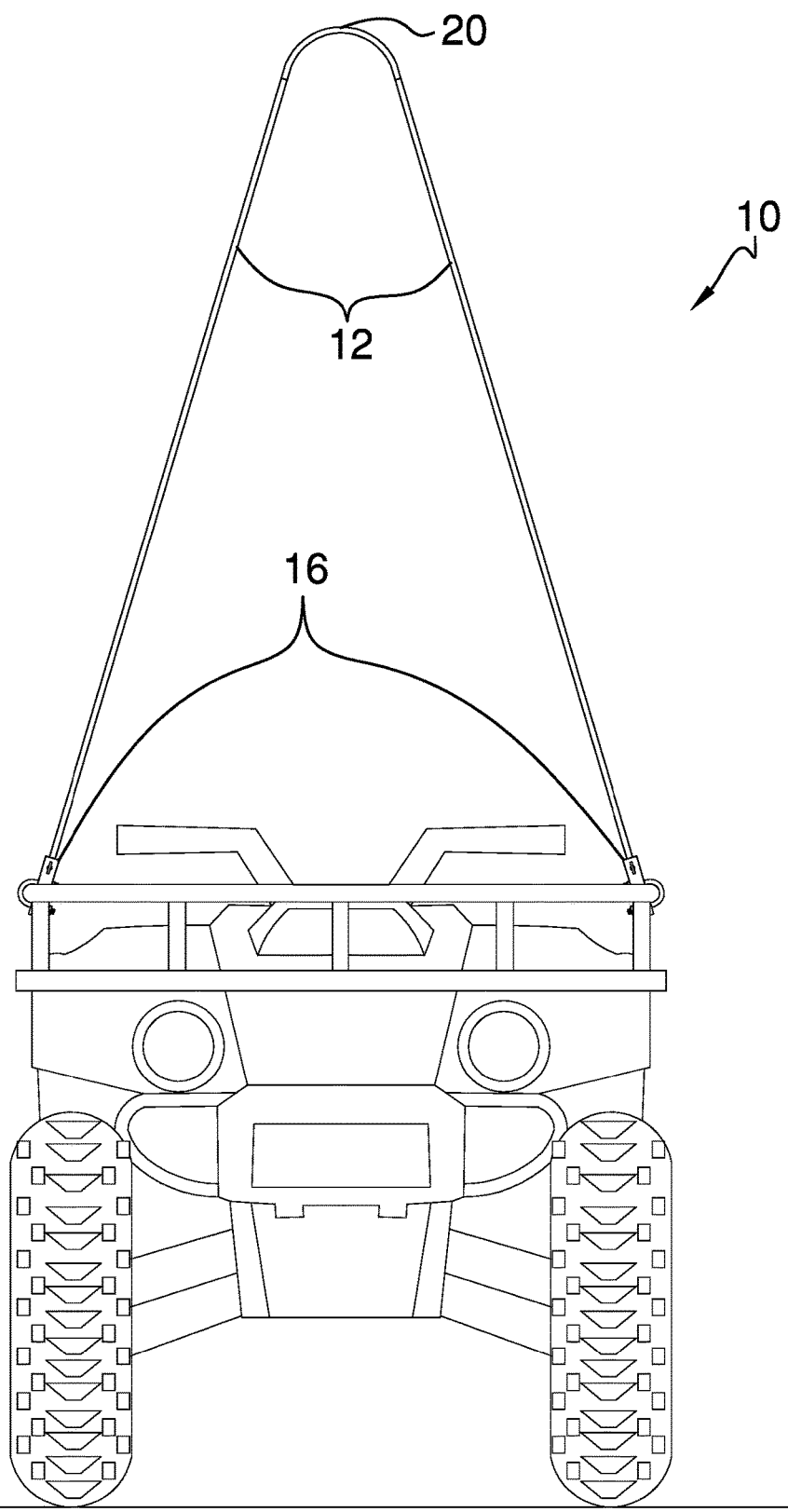
FIG. 5 is an in-use view of an embodiment of the disclosure.

The connector 14 is coupled to a first end 18 of each rod 12 so that the connector 14 extends between the rods 12. The connector 14 comprises a tube 20. The tube 20 is flexible so that the tube 20 is positioned to extend arcuately between the rods 12, as shown in FIG. 5.

Figure 3:
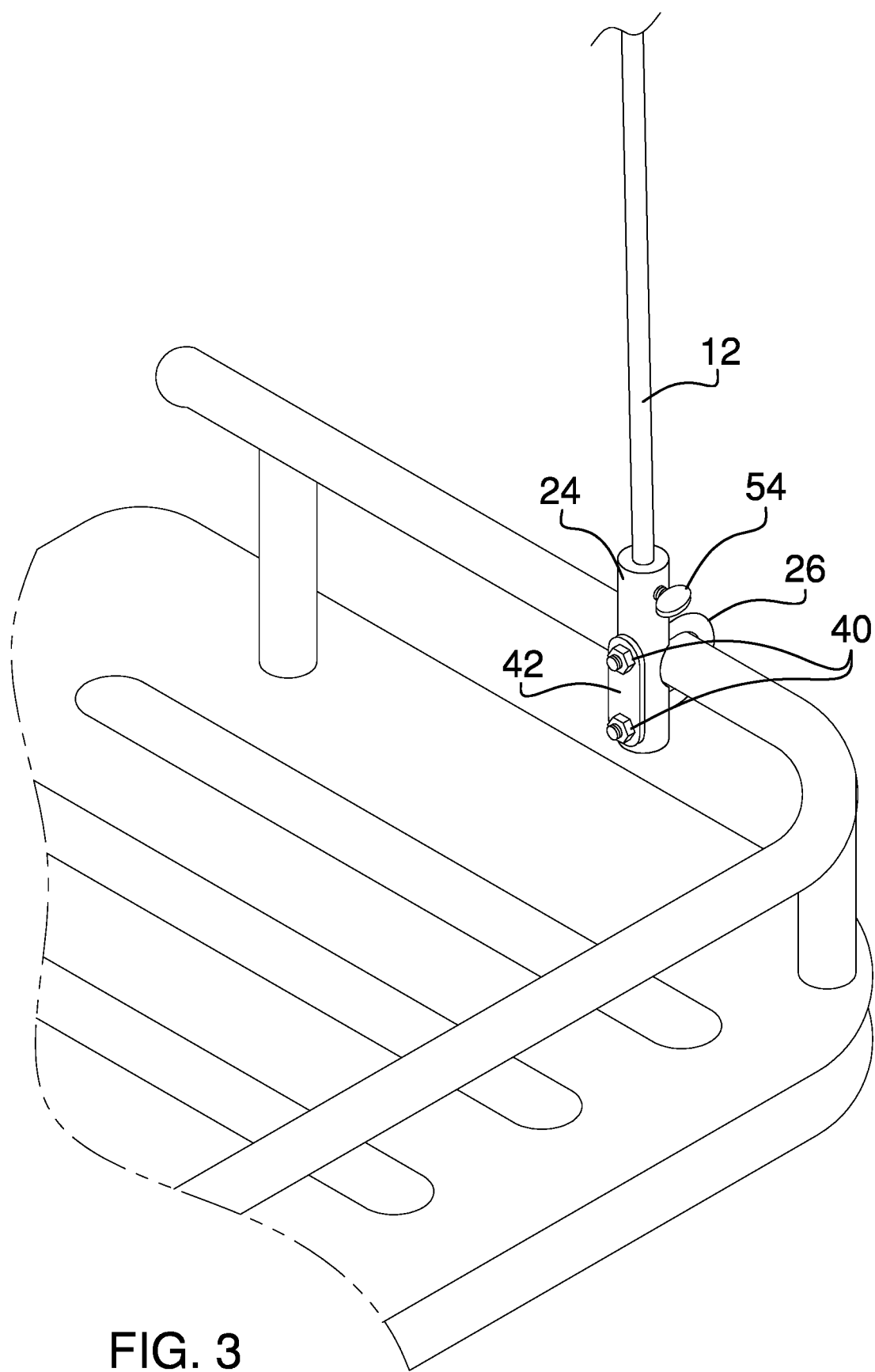
FIG. 3 is a detail view of an embodiment of the disclosure.
Figure 4:
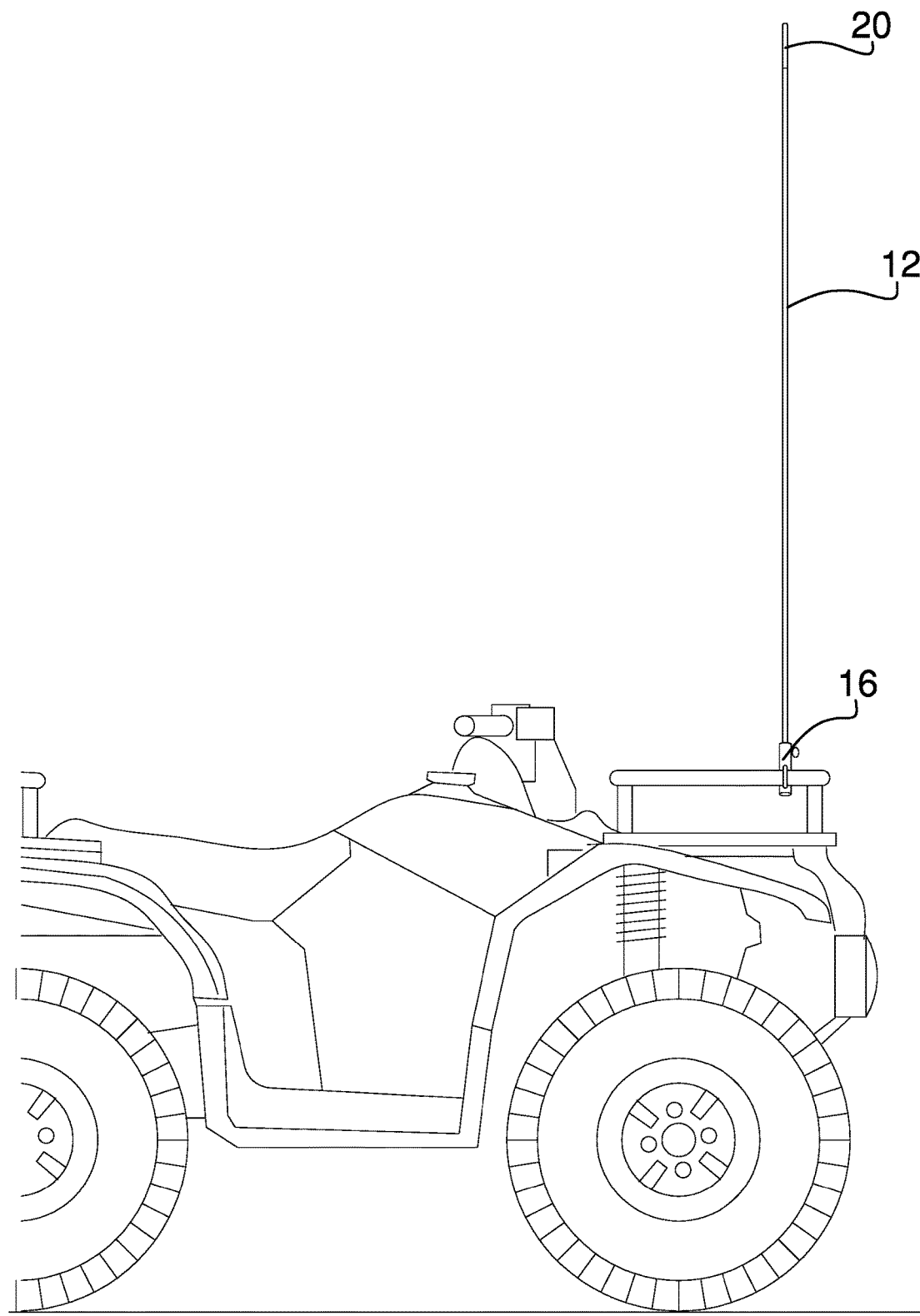
FIG. 4 is an in-use view of an embodiment of the disclosure.

Each coupler 16 is coupled to a second end 22 of a respective rod 12. The coupler 16 is configured to couple to an open-topped vehicle, such as an all-terrain vehicle, proximate to a respective front corner of the open-topped vehicle, as shown in FIG. 3, so that the rods 12 extend upwardly from the open-topped vehicle. The rods 12 are configured to sweep an object, such as a spider web or a branch, from a path in front of a driver of the open-topped vehicle to prevent contact between the object and the driver.

Figure 2:
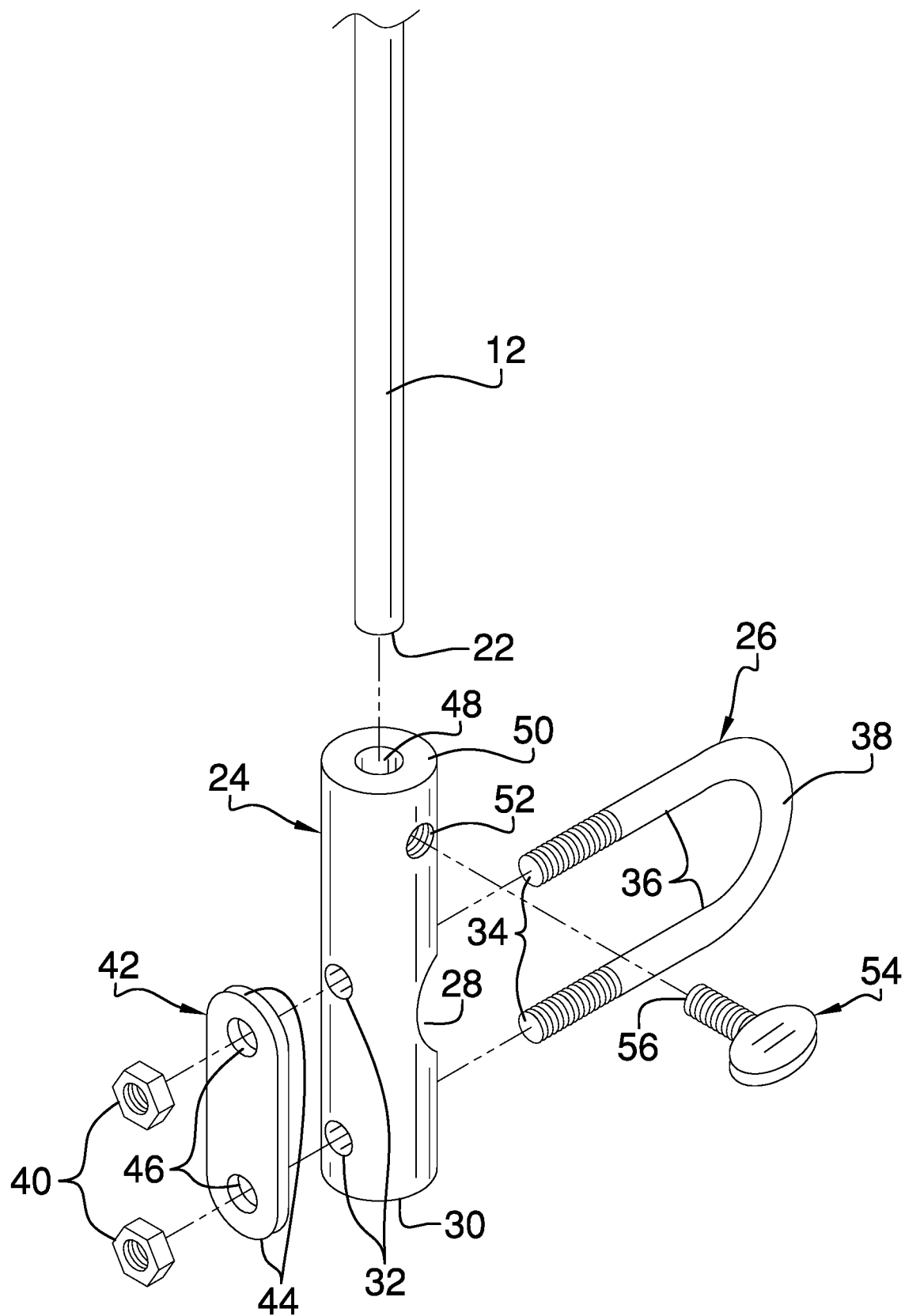
FIG. 2 is an exploded view of an embodiment of the disclosure.

Each coupler 16 comprises a cylinder 24 and a shaft 26, as shown in FIG. 2. The cylinder 24 is coupled to the second end 22 of the respective rod 12. A cutout 28 extends into the cylinder 24 proximate to a first terminus 30 of the cylinder 24. The cutout 28 is arcuate so that the cutout 28 is configured to insert a portion of a respective circular bar of a front rack of the open-topped vehicle.

A pair of shaft channels 32 is positioned through the cylinder 24 so that the shaft channels 32 bracket the cutout 28. The shaft channels 32 are circularly shaped when viewed longitudinally.

The shaft 26 has opposing ends 34. The shaft 26 is threaded proximate to each opposing end. The shaft 26 is U-shaped to define a pair of end sections 36 and a center section 38 of the shaft 26. The pair of shaft channels 32 is positioned to insert the end sections 36 of the shaft 26 so that the center section 38 of the shaft 26 and the cutout 28 encircle the respective circular bar of the front rack of the open-topped vehicle. Each of a pair of nuts 40 is positioned to threadedly couple to a respective end section 36 of the shaft 26 to couple the coupler 16 to the front rack of the open-topped vehicle.

The assembly 10 also comprises a plate 42 that has opposing edges 44, as shown in FIG. 2. The opposing edges 44 are arcuate to prevent scratching of the skin of a user. A pair of orifices 46 is positioned through the plate 42 so that each orifice 46 is positioned to align with a respective shaft channel 32. The orifice 46 and the respective shaft channel 32 are positioned to insert a respective end section 36 of the shaft 26 so that the center section 38 of the shaft 26 and the cutout 28 encircle the respective circular bar of the front rack of the open-topped vehicle. The nuts 40 are positioned to threadedly couple to the end sections 36 of the shaft 26 to couple the coupler 16 to the front rack of the open-topped vehicle. The plate 42, being flat, facilitates tightening of the nuts 40 onto the shaft 26 to firmly couple the coupler 16 to the front rack.

An end channel 48 extends into the cylinder 24 from a second terminus 50 of the cylinder 24, as shown in FIG. 2. The end channel 48 is positioned to selectively insert the second end 22 of the respective rod 2. A hole 52 extends into the cylinder 24 to the end channel 48. The hole 52 is threaded. A thumbscrew 54, which is complementary to the hole 52, is positioned to threadedly insert into the hole 52 so that an endpoint 56 of the thumbscrew 54 abuts the respective rod 12 to removably couple the cylinder 24 to the respective rod, as shown in FIG. 3. This configuration allows the pair of rods 12 to be removed from the open-topped vehicle while leaving the pair of couplers 16 coupled to the open-topped vehicle.

In use, the rods 12 are coupled to the front rack of the all-terrain vehicle, positioning the rods 12 in front of the driver. The rods 12 are configured to sweep the spider webs and branches from the path in front of the driver of the all-terrain vehicle to prevent contact between the spider webs and branches and the driver.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A deflector assembly comprising:
    a pair of rods;
    a connector coupled to a first end of each rod such that the connector extends between the rods; and
    a pair of couplers, each coupler being coupled to a second end of a respective rod wherein the coupler is configured for coupling to an open-topped vehicle proximate to a respective front corner of the open-topped vehicle such that the rods extend upwardly from the open-topped vehicle wherein the rods are configured for sweeping an object from a path in front of a driver of the open-topped vehicle for preventing contact between the object and the driver, each coupler comprising:
    a cylinder coupled to the second end of the respective rod,
    a cutout extending into the cylinder proximate to a first terminus of the cylinder, the cutout being arcuate such that the cutout is configured for inserting a portion of a respective circular bar of a front rack of the open-topped vehicle,
    a pair of shaft channels positioned through the cylinder such that the shaft channels bracket the cutout,
    a shaft having opposing ends, the shaft being threaded proximate to each opposing end, the shaft being U-shaped defining a pair of end sections and a center section of the shaft wherein the pair of shaft channels is positioned for inserting the end sections of the shaft such that the center section of the shaft and the cutout encircle the respective circular bar of the front rack of the open-topped vehicle, and
    a pair of nuts, each nut being positioned for threadedly coupling to a respective end section of the shaft for coupling the coupler to the front rack of the open-topped vehicle;
    a plate; and
    a pair of orifices positioned through the plate such that each orifice is positioned for aligning with a respective shaft channel positioning the orifice and the respective shaft channel for inserting a respective end section of the shaft such that the center section of the shaft and the cutout encircle the respective circular bar of the front rack of the open-topped vehicle positioning the nuts for threadedly coupling to the end sections of the shaft for coupling the coupler to the front rack of the open-topped vehicle.

2. The assembly of claim 1, further including the rods being flexible.

3. The assembly of claim 2, further including the rods comprising fiberglass.

4. The assembly of claim 1, further including the rods being circularly shaped when viewed longitudinally.

5. The assembly of claim 1, further including the connector comprising a tube, the tube being flexible wherein the tube is positioned for extending arcuately between the rods.

6. The assembly of claim 1, further including the shaft channels being circularly shaped when viewed longitudinally.

7. The assembly of claim 1, further including the plate having opposing edges, the opposing edges being arcuate.

8. A deflector assembly comprising:
    a pair of rods;
    a connector coupled to a first end of each rod such that the connector extends between the rods; and
    a pair of couplers, each coupler being coupled to a second end of a respective rod wherein the coupler is configured for coupling to an open-topped vehicle proximate to a respective front corner of the open-topped vehicle such that the rods extend upwardly from the open-topped vehicle wherein the rods are configured for sweeping an object from a path in front of a driver of the open-topped vehicle for preventing contact between the object and the driver, each coupler comprising:

a cylinder coupled to the second end of the respective rod, a cutout extending into the cylinder proximate to a first terminus of the cylinder, the cutout being arcuate such that the cutout is configured for inserting a portion of a respective circular bar of a front rack of the open-topped vehicle, a pair of shaft channels positioned through the cylinder such that the shaft channels bracket the cutout, a shaft having opposing ends, the shaft being threaded proximate to each opposing end, the shaft being U-shaped defining a pair of end sections and a center section of the shaft wherein the pair of shaft channels is positioned for inserting the end sections of the shaft such that the center section of the shaft and the cutout encircle the respective circular bar of the front rack of the open-topped vehicle, and a pair of nuts, each nut being positioned for threadedly coupling to a respective end section of the shaft for coupling the coupler to the front rack of the open-topped vehicle;

an end channel extending into the cylinder from a second terminus of the cylinder wherein the end channel is positioned for selectively inserting the second end of the respective rod;

a hole extending into the cylinder to the end channel, the hole being threaded; and a thumbscrew complementary to the hole wherein the thumbscrew is positioned for threadedly inserting into the hole such that an endpoint of the thumbscrew abuts the respective rod for removably coupling the cylinder to the respective rod.

9. A deflector assembly comprising:

a pair of rods, the rods being flexible, the rods comprising fiberglass, the rods being circularly shaped when viewed longitudinally;

a connector coupled to a first end of each rod such that the connector extends between the rods, the connector comprising a tube, the tube being flexible wherein the tube is positioned for extending arcuately between the rods; and a pair of couplers, each coupler being coupled to a second end of a respective rod wherein the coupler is configured for coupling to an open-topped vehicle proximate to a respective front corner of the open-topped vehicle such that the rods extend upwardly from the open-topped vehicle wherein the rods are configured for sweeping an object from a path in front of a driver of the open-topped vehicle for preventing contact between the object and the driver, each coupler comprising:

a cylinder coupled to the second end of the respective rod, a cutout extending into the cylinder proximate to a first terminus of the cylinder, the cutout being arcuate such that the cutout is configured for inserting a portion of a respective circular bar of a front rack of the open-topped vehicle, a pair of shaft channels positioned through the cylinder such that the shaft channels bracket the cutout, the shaft channels being circularly shaped when viewed longitudinally, a shaft having opposing ends, the shaft being threaded proximate to each opposing end, the shaft being U-shaped defining a pair of end sections and a center section of the shaft wherein the pair of shaft channels is positioned for inserting the end sections of the shaft such that the center section of the shaft and the cutout encircle the respective circular bar of the front rack of the open-topped vehicle, a pair of nuts, each nut being positioned for threadedly coupling to a respective end section of the shaft for coupling the coupler to the front rack of the open-topped vehicle, a plate, the plate having opposing edges, the opposing edges being arcuate, a pair of orifices positioned through the plate such that each orifice is positioned for aligning with a respective shaft channel positioning the orifice and the respective shaft channel for inserting a respective end section of the shaft such that the center section of the shaft and the cutout encircle the respective circular bar of the front rack of the open-topped vehicle positioning the nuts for threadedly coupling to the end sections of the shaft for coupling the coupler to the front rack of the open-topped vehicle, an end channel extending into the cylinder from a second terminus of the cylinder wherein the end channel is positioned for selectively inserting the second end of the respective rod, a hole extending into the cylinder to the end channel, the hole being threaded, and a thumbscrew complementary to the hole wherein the thumbscrew is positioned for threadedly inserting into the hole such that an endpoint of the thumbscrew abuts the respective rod for removably coupling the cylinder to the respective rod.

* * * * *